United States Patent [19]

Kitsunai et al.

[11] Patent Number: 4,608,414

[45] Date of Patent: Aug. 26, 1986

[54] THERMOPLASTIC RESIN COMPOSITION CONTAINING AN IMIDE POLYMER AND GRAFT COPOLYMER

[75] Inventors: Tomoyuki Kitsunai, Machida; Tetsuji Miura, Tokyo; Norio Yagi, Atsugi, all of Japan

[73] Assignee: Denki Kagaku Kogyo Kabushiki Kaisha, Tokyo, Japan

[21] Appl. No.: 800,099

[22] Filed: Nov. 22, 1985

Related U.S. Application Data

[63] Continuation of Ser. No. 632,114, Jul. 18, 1984, abandoned.

[30] Foreign Application Priority Data

Jul. 19, 1983 [JP] Japan .................................. 58-131533

[51] Int. Cl.$^4$ ........................ C08L 55/02; C08L 25/08
[52] U.S. Cl. ........................................ 525/71; 525/72; 525/73; 525/74
[58] Field of Search ............................. 525/71, 73, 74

[56] References Cited

U.S. PATENT DOCUMENTS

| | | | |
|---|---|---|---|
| 3,642,949 | 2/1972 | Stafford et al. | 525/73 |
| 3,651,171 | 3/1972 | von Bonin | 525/73 |
| 3,652,721 | 3/1972 | Dalton et al. | 525/71 |
| 3,652,726 | 3/1972 | Nield . | |
| 4,404,322 | 9/1983 | Saito et al. | 525/74 |
| 4,510,287 | 4/1985 | Wu | 525/73 |
| 4,567,233 | 1/1986 | Tomono et al. | 525/73 |

FOREIGN PATENT DOCUMENTS 1143408 3/1966 United Kingdom .

Primary Examiner—Carman J. Seccuro
Attorney, Agent, or Firm—Oblon, Fisher, Spivak, McClelland & Maier

[57] ABSTRACT

A thermoplastic resin composition comprising:

(A) from 10 to 90 parts by weight of an imide-modified polymer having an imido group and obtained by reacting ammonia and/or a primary amine to a copolymer prepared by the polymerization of a monomer mixture comprising from 50 to 70% by weight of an aromatic vinyl monomer and from 30 to 50% by weight of an unsaturated dicarboxylic acid anhydride;

(B) from 10 to 90 parts by weight of a graft copolymer prepared by copolymerizing from 30 to 75% by weight of a mixture comprising from 40 to 80% by weight of a rubber-like polymer having a weight average particle size of from 0.3 to 0.6 μm and from 20 to 60% by weight of a rubber-like polymer having a weight average particle size of from 0.1 to 0.2 μm, with from 25 to 70% by weight of a monomer mixture comprising from 55 to 75% by weight of an aromatic vinyl monomer and from 25 to 45% by weight of a vinyl cyanide monomer, said rubber-like polymer being a butadiene polymer or a butadiene copolymer containing at least 50% by weight of butadiene; and (C) from 0 to 80 parts by weight of a copolymer prepared by polymerizing from 40 to 80% by weight of an aromatic vinyl monomer, from 0 to 40% by weight of a vinyl cyanide monomer and from 0 to 40% by weight of a vinyl monomer copolymerizable therewith.

10 Claims, No Drawings

THERMOPLASTIC RESIN COMPOSITION CONTAINING AN IMIDE POLYMER AND GRAFT COPOLYMER

This application is a continuation of application Ser. No. 632,114, filed July 18, 1984, now abandoned.

The present invention relates to a thermoplastic resin composition having excellent heat resistance, impact resistance and hot water resistance. More particularly, it relates to a thermoplastic resin composition which comprises, as essential components, an imide-modified copolymer obtained by reacting ammonia and/or a primary amine to a copolymer prepared by the polymerization of an aromatic vinyl monomer with a substantial amount of an unsaturated dicarboxylic acid anhydride, and a graft copolymer prepared by graft polymerizing an aromatic vinyl monomer and a vinyl cyanide monomer to a rubber having a certain specific particle size distribution.

Heretofore, it has been known to prepare a copolymer from an aromatic vinyl monomer and an unsaturated dicarboxylic acid anhydride. (Japanese Examined Patent Publications No. 15829/1965, No. 31853/1970 and No. 10156/1974). However, these copolymers contain acid anhydride groups derived from the unsaturated dicarboxylic acid anhydrides, and accordingly they have drawbacks that they are susceptible to thermal decomposition, and they are also susceptible to hydrolysis in a hot water.

U.S. Pat. Nos. 3,642,949 and 3,651,171 disclose compositions obtained by blending a so-called ABS resin with a copolymer of an aromatic vinyl monomer with an unsaturated dicarboxylic anhydride or its imide. However, the impact strength of such compositions is low and inadequate in either case of using an unsaturated dicarboxylic acid anhydride or using an unsaturated dicarboxylic acid imide. Particularly when a copolymer or imide-modified copolymer containing more than 30% by weight of an unsaturated dicarboxylic acid is used for the blend composition with an ABS resin, the impact strength of such a composition is inadequate.

It is an object of the present invention to overcome these drawbacks and to provide a thermoplastic resin composition having improved impact resistance as well as excellent heat resistance by using a so-called ABS resin as an essential component wherein an imide-modified copolymer obtained by copolymerizing a substantial amount of an unsaturated dicarboxylic acid anhydride and a rubber having a specific particle size distribution.

Namely, the present invention provides a thermoplastic resin composition comprising:

(A) from 10 to 90 parts by weight of an imide-modified polymer having an imido group and obtained by reacting ammonia and/or a primary amine to a copolymer prepared by the polymerization of a monomer mixture comprising from 50 to 70% by weight of an aromatic vinyl monomer and from 30 to 50% by weight of an unsaturated dicarboxylic acid anhydride;

(B) from 10 to 90 parts by weight of a graft copolymer prepared by copolymerizing from 30 to 75% by weight of a mixture comprising from 40 to 80% by weight of a rubber-like polymer having a weight average particle size of from 0.3 to 0.6 μm and from 20 to 60% by weight of a rubber-like polymer having a weight average particle size of from 0.1 to 0.2 μm, with from 25 to 70% by weight of a monomer mixture comprising from 55 to 75% by weight of an aromatic vinyl monomer and from 25 to 45% by weight of a vinyl cyanide monomer, said rubber-like polymer being a butadiene polymer or a butadiene copolymer containing at least 50% by weight of butadiene; and (C) from 0 to 80 parts by weight of a copolymer prepared by polymerizing from 40 to 80% by weight of an aromatic vinyl monomer, from 0 to 40% by weight of a vinyl cyanide monomer and from 0 to 40% by weight of a vinyl monomer copolymerizable therewith.

The thermoplastic resin composition of the present invention may be composed solely of components (A) and (B). However, component (C) i.e. an aromatic vinyl copolymer may further be incorporated thereto in an amount of not higher than 80% by weight without leading to deterioration of the excellent properties of the thermoplastic resin composition of the present invention. This is advantageous in that a relatively inexpensive aromatic vinyl copolymer can be incorporated in a substantial amount.

Now, the present invention will be described in detail with reference to the preferred embodiments.

Firstly, the polymer of component (A) and a process for its preparation will be described.

The polymer constituting the base material for the imide-modified polymer of component (A) is a copolymer comprising from 50 to 70% by weight of an aromatic vinyl monomer and from 30 to 50% by weight of an unsaturated dicarboxylic acid anhydride. If the aromatic vinyl monomer is less than 50% by weight, the moldability and the dimensional stability as the features of the aromatic vinyl compound tend to be lost. On the other hand, if the unsaturated dicarboxylic acid anhydride is less than 30% by weight, no adequate improvement in the heat resistance will be obtainable. If the amount exceeds 50% by weight, the copolymer tends to be brittle and the moldability will be extremely poor.

As the aromatic vinyl monomer constituting component (A), there may be mentioned a styrene monomer and its substituted monomer such as styrene, α-methylstyrene, vinyl toluene, t-butylstyrene or chlorostyrene. Among these, styrene is particularly preferred.

The unsaturated dicarboxylic acid anhydride includes maleic anhydride, itaconic anhydride, citraconic anhydride or aconitic anhydride. Among these, maleic anhydride is particularly preferred.

The ammonia or primary amine to be used for the imide-modification reaction in the present invention, may be in the form of either an anhydride or an aqueous solution. The primary amine includes, e.g. an alkyl amine such as methyl amine, ethyl amine, propyl amine, butyl amine or cyclohexyl amine, and an alkyl amine substituted by chlorine or bromine; an aromatic amine such as aniline, tolyl amine or naphthyl amine, and a halogen-substituted aromatic amine such as chloro- or bromo-substituted aniline. Among these, aniline and methyl amine are particularly preferred.

In the present invention, for the imide-modification of the aromatic vinyl-unsaturated dicarboxylic acid anhydride copolymer, a catalyst may be present. It is usual to use a tertiary amine as the catalyst.

When the imide-modification reaction is conducted in a state of a solution or suspension, it is preferred to use a usual reactor such as an autoclave. In the case where the reaction is conducted in a state of a molten mass, an extruder equipped with a deaerator may be employed. The imide-modification reaction is usually conducted at a temperature of from about 80° to about 350° C., preferably from 100° to 300° C. If the temperature is lower than 80° C., reaction is slow, and it requires a long period of time and is not practical. On the other hand, if the temperature exceeds 350° C., the polymer tends to undergo thermal decomposition, whereby the physical properties will be deteriorated.

As a solvent for the imide-modification reaction of the aromatic vinyl-unsaturated dicarboxylic acid anhydride copolymer in a liquid state, there may be mentioned, e.g. acetone, methyl ethyl ketone, methyl isobutyl ketone, acetophenone, cyclohexanone, tetrahydrofuran, toluene, xylene or chlorobenzene. As a medium for the imide-modification reaction in a suspension state, there may be mentioned an aliphatic hydrocarbon such as heptane, hexane, pentane, octane, 2-methylpentane, cyclopentane or cyclohexane, and water.

Now, component (B) and the process for its production will be described. As the rubber-like polymer to be used as component (B), there may be mentioned a butadiene polymer or a butadiene copolymer containing at least 50% of butadiene, such as a butadiene-styrene copolymer, a butadiene-methylmethacrylate copolymer or a butadiene-acrylonitrile copolymer. For the improvement of the impact resistance, it is important that the rubber-like polymer comprises from 40 to 80% by weight of a rubber-like polymer having a weight average particle size of from 0.3 to 0.6 $\mu$m and from 20 to 60% by weight of a rubber-like polymer having a weight average particle size of from 0.1 to 0.2 $\mu$m. The rubber-like polymer having a weight average particle size of from 0.3 to 0.6 $\mu$m is obtainable by a conventional method for growing rubber particles having small particle sizes, for instance, a method wherein the pH is lowered, or a method wherein the particles are grown by treating them mechanically by passing them through nozzles. With respect to the rubber-like polymer having a weight average particle size of from 0.1 to 0.2 $\mu$m, particularly preferred is a rubber-like polymer obtainable by seed polymerization. The weight average particle size of the rubber-like polymer can be determined by the measurement by means of an electron microscopic photography. The aromatic vinyl monomer to be graft polymerized to such rubber-like polymers, includes a styrene monomer and its substituted monomer such as styrene, $\alpha$-methylstyrene, vinyl toluene, t-butylstyrene or chlorostyrene. Among them, styrene is particularly preferred.

As the vinyl cyanide monomer, there may be mentioned acrylonitrile, methacrylonitrile or $\alpha$-chloroacrylonitrile.

The graft copolymer of component (B) is obtainable by graft copolymerizing from 25 to 70% by weight of a monomer mixture comprising from 55 to 75% by weight of the aromatic vinyl monomer and from 25 to 45% by weight of the vinyl cyanide monomer, in the presence of from 30 to 75% by weight of the rubber-like polymer. For the polymerization, any conventional polymerization technique may be employed. For instance, an aqueous heterogeneous polymerization such as a suspension polymerization or emulsion polymerization, a bulk polymerization, a solution polymerization and a precipitation polymerization in a non-solvent for the resulting polymer.

Now, component (C) and the process for its preparation will be described.

The aromatic vinyl monomer of component (C) includes a styrene monomer and its substituted monomer such as styrene, $\alpha$-methylstyrene, vinyl toluene, t-butylstyrene or chlorostyrene. Among them, $\alpha$-methylstyrene and styrene are particularly preferred.

As the vinyl cyanide monomer, there may be mentioned acrylonitrile, methacrylonitrile or -chloroacrylonitrile. Particularly preferred is acrylonitrile.

As the vinyl monomer copolymerizable with the above monomers, there may be mentioned an acrylate such as methylacrylate, ethylacrylate or butylacrylate; a methacrylate such as methylmethacrylate or ethylmethacrylate; a vinyl carboxylic acid monomer such as acrylic acid or methacrylic acid; an acrylic acid amide; a methacrylic acid amide; acenaphthylene; an N-vinyl carbazole; an N-alkyl-substituted maleimide or an N-aromatic substituted maleimide.

The composition of the present invention is a mixture of components (A) and (B), to which component (C) is optionally incorporated. There is no particular restriction to the method of mixing. Namely, the mixing can be conducted by means of a conventional means such as a Bumbury's mixer, a Henschel mixer, a tumbling mixer, a mixing roll or a single screw or double screw extruder. As the mixing mode, there may be employed a conventional melt mixing, a stepwise melt kneading wherein master pellets are used, a solution blending method, a solution latex blending method or a method wherein the composition is obtained by the graft polymerization in the presence of an aromatic vinyl copolymer and/or an imide-modified polymer.

Components (A), (B) and (C) may be blended in such proportions that component (A) is from 10 to 90 parts by weight, component (B) is from 10 to 90 parts by weight and component (C) is from 0 to 80 parts by weight. However, the preferred ranges are such that component (A) is from 20 to 70 parts by weight, component (B) is from 30 to 60 parts by weight and component (C) is from 0 to 50 parts by weight. The reason for limiting the blending proportions as above is that in order to prevent the deterioration of the moldability and improve the impact resistance while maintaining the excellent heat resistance and hot water resistance of component (A) and to maintain other properties in a satisfactory balanced state, it is necessary to blend components (B) and (C) in proper blending proportions.

Further, it is also possible to incorporate into the composition of the present invention a stabilizer, a flame retardant, a plasticizer, a lubricant, a glass fiber, a carbon fiber, a filler such as calcium carbonate, talc or mica, a coloring agent or an ultraviolet absorber.

The composition of the present invention is useful for applications where heat resistance and impact resistance are required. For instance, it can advantageously be used for automobile parts, electric and electronic parts, household electric appliances or office appliances. Further, it is also useful for kitchen utensils, containers for foods and drinks, bathroom articles and medical appliances since it is superior in hot water resistance.

Now, the present invention will be described with reference to Examples. However, it should be understood that the present invention is by no means restricted by these specific Examples. In these Examples, "parts" and "%" mean "parts by weight" and "% by weight", respectively.

EXAMPLES 1 to 6

Experiment (1): Preparation of an imide-modified copolymer (component (A))

Into an autoclave equipped with a stirrer, 57 parts of styrene (hereinafter referred to simply as "St") and 30 parts of methyl ethyl ketone were fed. After flushing the inside of the autoclave with nitrogen gas, the temperature was raised to 85° C., and a solution prepared by dissolving 43 parts of maleic anhydride (hereinafter referred to simply as "MAH") and 0.2 part of benzoyl peroxide in 250 parts of methyl ethyl ketone, was continuously added over a period of 6 hours. After the addition, the reaction system was kept at 85° C. for further 4 hours. A part of the viscous reaction solution was sampled and subjected to a quantitative analysis of unreacted monomers by gas chromatography, whereupon the degree of polymerization and the MAH content in the polymer were calculated. The degree of polymerization was found to be 97%, and the MAH content in the polymer was found to be 42.5%. To the above reaction solution, 40.8 parts of aniline (i.e. the equimolar amount to the maleic anhydride groups) and 0.5 part of triethylamine as a catalyst for imide-modification, were added, and reacted at 140° C. for 6 horus. The reaction solution was cooled, and poured into 1000 parts of vigorously agitated methanol, whereupon the precipitated product was filtered and dried to obtain an imide-modified polymer. From the C-13 NMR analysis, the conversion of the acid anhydride groups to the imido groups was almost 100%. This was designated as Test No. 1.

In the same manner as in Test No. 1 except that the charges of St and MAH were changed to 63 parts and 37 parts, respectively, and the amount of aniline was changed to 35.1 parts, an imide-modified copolymer was obtained. The degree of polymerization was 98%, the MAH content in the polymer was 37.5%, and the conversion to the imido groups was almost 100%. This was designated as Test No. 2.

Experiment (2): Preparation of graft copolymer (component (B))

150 Parts of polybutadiene latex (solid content 40%, weight average particle size 0.35 μm, gel content 90%), 114.3 parts of a copolymer latex (solid content 35%, weight average particle size 0.15 μm) comprising 75% of butadiene and 25% of styrene, 1 part of potassium stearate, 0.1 part of sodium formaldehyde sulfoxylate, 0.03 part of tetrasodium ethylene diamine tetraacetic acid, 0.003 part of ferrous sulfate and 400 parts of water, were heated to 50° C., and 100 parts of a monomer mixture comprising 70% of St and 30% of acrylonitrile (hereinafter referred to simply as "AN"), 0.4 part of t-dodecylmercaptane and 0.2 part of cumene hyperoxide, were continuously added over a period of 6 hours. After the completion of the addition, polymerization was continued at 65° C. for 2 hours. The degree of polymerization reached 97.5%. After an addition of an antioxidant to the latex thereby obtained, the latex was solidified by means of calcium chloride, washed with water and dried, whereupon a graft copolymer was obtained as a white powder. This was designated as Test No. 3.

Experiment (3): Preparation of a thermoplastic copolymer (component (C)) containing an aromatic vinyl compound as an essential component 72 Parts of α-methyl styrene (hereinafter referred to simply as "α-MS"), 28 parts of AN, 2.5 parts of potassium stearate, 0.3 part of t-dodecylmercaptane and 250 parts of water, were heated to 70° C., and 0.05 part of potassium persulfate was added to initiate polymerization. Upon expiration of 5 hours from the initiation of the polymerization, 0.03 part of potassium persulfate was further added, and the temperature was raised to 75° C. and held at the temperature for 3 hours to complete the polymerization. The degree of polymerization was 96.5%. The obtained latex was solidified by means of potassium chloride, washed with water and dried, whereupon a white powder copolymer was obtained. This was designated as Test No. 4.

In the same manner as in Test No. 4 except that 50 parts of α-MS, 15 parts of St, 25 parts of AN and 10 parts of N-phenylmaleimide were used as monomers, a copolymer was obtained. This was designated as Test No. 5.

Experiment (4): Blend of components (A), (B) and (C)

Components (A), (B) and (C) were blended in the ratios as identified in Table 1. Each blend was extruded by a 30 mmφ/screw extruder equipped with a deaerator, and pelletized. To each blend, 0.2 part of octadecyl-3-(3,5-di-tertiary butyl-4-hydroxyphenyl)propionate (antioxidant) and 2 parts of tristearyl phosphite were incorporated.

The physical properties of the compositions thus obtained were measured, and are presented in Table 1. Numerals in the blackets ( ) identify Test Nos. for the preparation of components (A), (B) and (C).

COMPARATIVE EXAMPLE 1

35 Parts of a graft copolymer (hereinafter referred to simply as "P") prepared in the same manner as in Experiment (2) except that 250 parts of the polybutadiene latex (solid content 40%, gel content 88%) having a weight average particle size of 0.2 μm was used as the rubber-like polymer and 65 parts of the imide-modified polymer obtained by Test No. 1 for the preparation of component (A) in Experiment (1), were blended in the same manner as in Experiment (4). The physical properties of the composition thereby obtained were measured and presented in Table 1.

COMPARATIVE EXAMPLE 2

30 Parts of the graft copolymer (B) of Comparative Example 1, 20 parts of the imide-modified copolymer obtained in Test No. 1 for the preparation of component (A) in Experiment (1) and 45 parts of the copolymer obtained in Test No. 4 for the preparation of component (C) in Experiment (3), were blended in the same manner as in Experiment (4). The physical properties of the obtained composition were measured and presented in Table 1.

TABLE 1

| No. | Blend compositions (Parts) | | | Physical properties | | |
|---|---|---|---|---|---|---|
| | Component (A) | Component (B) | Component (C) | Vicat softening point (°C.) | Impact strength (kg · cm/cm) | MFI (g/10 min.) |
| Example 1 | (1) 65 | (3) 35 | — | 160 | 7.0 | 0.4 |
| Example 2 | (1) 35 | (3) 30 | (4) 35 | 143 | 8.2 | 0.9 |
| Example 3 | (1) 35 | (3) 35 | (5) 30 | 145 | 7.7 | 0.7 |
| Example 4 | (1) 20 | (3) 30 | (4) 45 | 138 | 10.0 | 1.3 |
| Example 5 | (2) 65 | (3) 35 | — | 151 | 7.9 | 0.6 |
| Example 6 | (2) 50 | (3) 40 | (5) 10 | 148 | 11.8 | 0.4 |
| Comparative Example 1 | (1) 65 | P 35 | — | 157 | 2.5 | 0.3 |
| Comparative Example 2 | (1) 20 | P 30 | (4) 45 | 136 | 1.2 | |

From Table 1, it is apparent that the compositions of the present invention have remarkably improved impact strength by virtue of the graft copolymer composed of the rubber-like polymer having the specified particle sizes and incorporated in the specified proportions.

The measurements of the physical properties were conducted in according with the following methods:
(1) Vicat softening point: Load 5 kg, in accordance with ASTM D-1525.
(2) Impact strength: Notched izod strength, in accordance with ASTM D-256.
(3) MFI (melt flow index): Temperature 270° C., load 5 kg, in accordance with ASTM D-1238.

We claim:

1. A thermoplastic resin composition comprising:
(A) from 10 to 90 parts by weight of an imide-modified polymer having an imido group and obtained by reacting ammonia and/or a primary amine to a copolymer prepared by the polymerization of a monomer mixture comprising from 50 to 70% by weight of an aromatic vinyl monomer and from 30 to 50% by weight of an unsaturated dicarboxylic acid anhydride;
(B) from 10 to 90 parts by weight of a graft copolymer prepared by copolymerizing from 30 to 75% by weight of a mixture comprising from 40 to 80% by weight of a rubber-like polymer having a weight average particle size of from 0.3 to 0.6 μm and from 20 to 60% by weight of a rubber-like polymer having a weight average particle size of from 0.1 to 0.2 μm, with from 25 to 70% by weight of a monomer mixture comprising from 55 to 75% by weight of an aromatic vinyl monomer and from 25 to 45% by weight of a vinyl cyanide monomer, said rubber-like polymer being a butadiene polymer or a butadiene copolymer containing at least 50% by weight of butadiene; and
(C) from 0 to 80 parts by weight of a copolymer prepared by polymerizing from 40 to 80% by weight of an aromatic vinyl monomer, from 0 to 40% by weight of a vinyl cyanide monomer and from 0 to 40% by weight of a vinyl monomer copolymerizable therewith.

2. The thermoplastic composition according to claim 1, wherein the aromatic vinyl monomer in (A) is styrene, α-methylstyrene, vinyl toluene, t-butylstyrene or chlorostyrene.

3. The thermoplastic resin composition according to claim 1, wherein the unsaturated dicarboxylic acid anhydride in (A) is maleic anhydride, itaconic anhydride, citraconic anhydride or aconitic anhydride.

4. The thermoplastic resin composition according to claim 1, wherein the primary amine in (A) is an alkyl amine, a chloro- or bromo-substituted alkyl amine, an aromatic amine or a halogen-substituted aromatic amine.

5. The thermoplastic resin composition according to claim 1, wherein the butadiene copolymer in (B) is a butadiene-styrene copolymer, a butadiene-methylmethacrylate copolymer or a butadiene-acrylonitrile copolymer.

6. The thermoplastic resin composition according to claim 1, wherein the aromatic vinyl monomer in (B) is styrene, a-methylstyrene, vinyl toluene, t-butylstyrene or chlorostyrene.

7. The thermoplastic resin composition according to claim 1, wherein the vinyl cyanide monomer in (B) is acrylonitrile, methacrylonitrile or α-chloroacrylonitrile.

8. The thermoplastic resin composition according to claim 1, wherein the aromatic vinyl monomer in (C) is styrene, α-methylstyrene, vinyl toluene, t-butylstyrene or chlorostyrene.

9. The thermoplastic resin composition according to claim 1, wherein the vinyl cyanide monomer in (C) is acrylonitrile, methacrylonitrile or α-chloroacrylonitrile.

10. The thermoplastic resin composition according to claim 1, wherein the copolymerizable vinyl monomer in (C) is an acrylate monomer, a methacrylate monomer, a vinyl carboxylic acid monomer, an acrylic acid amide, a methacrylic acid amide, acenaphthylene, an N-vinyl carbazole, an N-alkyl-substituted maleimide or an N-aromatic substituted maleimide.

* * * * *